(12) United States Patent
Martin et al.

(10) Patent No.: US 12,122,670 B2
(45) Date of Patent: Oct. 22, 2024

(54) OZONE GENERATOR FOR GENERATING OZONE, A METHOD FOR GENERATING OZONE FROM AN OXYGEN RICH GAS AND USE OF THE GENERATOR

(71) Applicant: WATER APS, Farum (DK)

(72) Inventors: Richard Ailwyn Martin, Præstø (DK); Hans Christian Kromand, Humlebæk (DK); Paw Allen Tinghuus Petersen, Lynge (DK)

(73) Assignee: WATER APS, Farum (DK)

( * ) Notice: Subject to any disclaimer, the term of this patent is extended or adjusted under 35 U.S.C. 154(b) by 729 days.

(21) Appl. No.: 17/418,880

(22) PCT Filed: Feb. 19, 2020

(86) PCT No.: PCT/EP2020/054322
§ 371 (c)(1),
(2) Date: Jun. 28, 2021

(87) PCT Pub. No.: WO2020/173780
PCT Pub. Date: Sep. 3, 2020

(65) Prior Publication Data
US 2022/0055897 A1 Feb. 24, 2022

(30) Foreign Application Priority Data
Feb. 25, 2019 (DK) .............................. PA2019 00233

(51) Int. Cl.
*C01B 13/11* (2006.01)
(52) U.S. Cl.
CPC .......... *C01B 13/11* (2013.01); *C01B 2201/22* (2013.01); *C01B 2201/32* (2013.01); *C01B 2201/64* (2013.01)

(58) Field of Classification Search
CPC . C01B 13/11; C01B 2201/22; C01B 2201/32; C01B 2201/64; C01B 13/10
(Continued)

(56) References Cited

U.S. PATENT DOCUMENTS 9,067,788 B1 * 6/2015 Spielman ................ C01B 13/10
2018/0297844 A1 * 10/2018 Rodan ................... H05H 1/2406
2022/0370677 A1 * 11/2022 Kim .......................... A61L 9/22

FOREIGN PATENT DOCUMENTS

DE     197 12 007       9/1998
WO     2000/53529       9/2000
(Continued)

OTHER PUBLICATIONS

International Preliminary Report on Patentability and Written Opinion issued in PCT/EP2020/054322, Jan. 25, 2021, pp. 1-33.
(Continued)

*Primary Examiner* — Harry D Wilkins, III
*Assistant Examiner* — John Lee
(74) *Attorney, Agent, or Firm* — Jeffrey S. Melcher; Melcher Patent Law PLLC (57) ABSTRACT

Ozone generator (1) for generating ozone comprising at least one high voltage electrode HVE (2), two low voltage electrodes LVE (3), at least one dielectric (4) and an electric isolator (25) placed in an area between the two LVE (3', 3"). The generator (1) further comprises a first gap (7) and a second gap (8) and at least one of the gaps (7, 8) is a corona chamber. The at least one dielectric (4) comprising a first surface (9) is turning towards a HVE-surface (22) and an opposite second surface (10) is turning towards a first surface (17) of one of the LVE (3). The second surface (10) of the dielectric (4) is directly or indirectly supported in its full extension by the first LVE-surface (17), and at least one of the gaps (7, 8) is placed between the first surface (9) of
(Continued)

the dielectric (4) and a first HVE-surface (22), said gap is a corona-chamber adapted to develop ozone.

16 Claims, 9 Drawing Sheets

(58) Field of Classification Search
USPC .................................................. 422/186.07
See application file for complete search history.

(56) References Cited

FOREIGN PATENT DOCUMENTS

| WO | 2002/20398 | 3/2002 |
| WO | 2018/025133 | 2/2018 |

OTHER PUBLICATIONS

International Search Report issued in PCT/EP2020/054322, May 25, 2020, pp. 1-4.

\* cited by examiner

OZONE GENERATOR FOR GENERATING OZONE, A METHOD FOR GENERATING OZONE FROM AN OXYGEN RICH GAS AND USE OF THE GENERATOR

The present invention relates to an ozone generator for generating ozone comprising at least one high voltage electrode (HVE)—a first electrode—having a first HVE surface, an opposite second HVE surface;

two low voltage electrodes (LVE), a first LVE and a second LVE each comprising a first LVE surface and an opposite second LVE surface, said HVE(s) is/are placed in a region between the LVE, the generator further comprises at least one dielectric and an electric isolator placed in an area between the two LVE, the generator further comprises an inlet gas port for leading oxygen reach gas into the generator and an outlet gas port for leading generated ozone gas out of the generator, the generator further comprises a first gap and a second gap and at least one of the gaps being a corona chamber, that at least one dielectric comprising a first surface is turning towards the first HVE-surface and an opposite second surface is turning towards the first LVE surface of one of the LVE, and at least one of the gaps is placed between the first surface of said dielectric and the first HVE-surface, said gap being a corona-chamber adapted to develop ozone and that the oxygen is led through the inlet gas port to a duct ending in a center portion of one of the gaps.

The invention further comprises a method for generating ozone from an oxygen rich gas by leading the oxygen rich gas into an ozone generator comprising at least one high voltage electrode (HVE)—a first electrode—having a first HVE surface, an opposite second HVE surface;

two low voltage electrodes (LVE), a first LVE and a second LVE each comprising a first LVE surface and an opposite second LVE surface, said HVE(s) is/are placed in a region between the LVE, the generator further comprises at least one dielectric, and an isolator placed in an area between the two LVE, the generator further comprises an inlet gas port for leading oxygen reach gas into the generator and an outlet gas port for leading generated ozone gas out of the generator, the generator further comprises a first gap and a second gap and at least one of the gaps being a corona chamber, a voltage is applied to the at least one HVE electrodes and the oxygen rich gas is lead into a center of one of the gaps.

Finally, the invention relates to use of the generator according to the invention for performing the method according to the invention.

The abbreviation "HVE" is throughout the document used for high voltage electrode and the abbreviation "LVE" is throughout the document used for low voltage electrode.

Ozone is a very powerful, gaseous reactant, and its usefulness has been well established for many years in a wide range of industrial applications. Its value in all types of water purification applications has been coming to the fore because of its ability to act as a powerful oxidant, micro flocculants and disinfectant without producing toxic side-products.

It can destruct or remove for example complex organic molecules,

Cyanides and phenols from chemical waste, waste from paper plants and dye-mills, surfactants and detergents from washing processes, odors from wastewater plants.

Ozone is further used for pretreating drinking water, enhancing its quality considerably. Ozone is also used for bleaching pulp in the paper-making industry.

It is well known that ozone is generated by so-called dark or cold electrical discharges in oxygen gas or oxygen-rich gas mixtures. Presently known devices for generating ozone in satisfactory quantities and concentrations for industrial applications, however, are very voluminous and are difficult and expensive to service.

The most widely used method of generating ozone is to flow dry air or oxygen through a narrow gap bordered on one side by a conductive electrode and on the other side by another electrode. An alternating high voltage is connected across the electrodes, producing a high voltage field across the gap, which creates a corona discharge. This discharge (cold plasma discharge) converts a percentage of the oxygen rich gas to ozone. A dielectric is necessary to prevent arcs between the conductive electrodes, which would rapidly destroy the electrode surfaces.

Wo 02/20398 A1 discloses an ozone generator and a method for generating ozone by exposing oxygen to a high frequency alternating current with high voltage over a dielectric. It comprises a high voltage electrode unit having a centrally positioned flat electric conductor having a dielectric arranged at each side.

In order to avoid that the very fragile dielectric is cracking it is necessary to manage the flow of gas into the generator quit precise.

US 2018/0297844 discloses a cold plasma ozone generator, comprising an inlet gas port and at least one in-electrode. It further comprises one out-electrode having at least one hole at the center. The hole is configured to allow gas to pass there through. The in-electrode and out-electrode are maintaining a high voltage AC there between. A spacer is placed between the in-electrode and the out-electrode whereby a constant width gap between them is provided. The generator is not suitable to be used in environments causing high pressure on the generator such as deep under the water.

WO2018/025133 discloses an ozone generator seeking to provide a solution to the existing problems of pressure variations and cooling of ozone generators. Since not all gas is passed and clearly controlled across the high-voltage electrode and the two dielectrics, but only some of the gas is exposed to the dielectrics, the capacity of the generator will be reduced. Further as at least one of the dielectrics is weakened by at through going hole the capacity is further reduced and there is a risk of short-circuiting between the free-lying hollow edge of the dielectric and the high voltage electrode.

With other words, it is desirable to be able to provide an ozone generator that can work with and under high pressure. Further, it is desirable that the generator has a high efficiency and produces large quantities of ozone.

The present invention seeks generally to improve an ozone generator device such that the abovementioned insufficiencies and drawbacks of today's ozone generators are overcome or at least it provides a useful alternative. Up to this day, prior art has failed to teach a simple and yet reliable and inexpensive ozone generator which in a safe and reliable manner, without substantially increasing the cost of the device, is able to satisfy the abovementioned much desired characteristics of the mentioned ozone generator. It is especially desirable that it is suitable for withstanding high internal pressures and up to at least 8-10 bars.

According to the invention, a generator is provided, as per the introductory part of this specification, and wherein
the second surface of the dielectric is directly or indirectly supported in its full extension by the first LVE-surface, and the isolator has a plurality of communication holes placed in a distance from a center of the isolator and the communication holes being in fluid communication with the duct,
said communication holes are fluidly connecting the two gaps whereby gas is allowed to flow from the gap being in fluid communication with the inlet gas port to the opposite placed gap being in fluid communication with the outlet gas port.

The generator is preferably made of flat elements. The dielectric is a flat device preferably a ceramic plate with a uniform thickness of 500-700μ. The LVE are also quite flat constructed with the surface turning towards the interior of the generator being flat, smooth and even. This is especially important when the surface is supporting the dielectric. The HVE has also a flat, smooth, and even first HVE surface. The generator may comprise one or two HVE and one or two dielectric. The gap for producing ozone is at one side delimited by the first HVE surface and at the other side delimited by the dielectric. If both gaps are producing ozone both gaps are delimited as indicated. If only one gap is producing ozone and constructed as mentioned the other gap is placed between the first surface of one of the LVE and a surface of the isolator.

The gas is led into the center of a gap and from here; it flows to the periphery and leaves the gap through communication holes placed in the isolator—that is channels arranged such that fluid-communication from the periphery from one gap to the periphery of the other gap takes place. The gas then enters the other gap and flows into the middle of this gap. From here, it leaves the generator through a duct.

Before oxide-rich gas is supplied to the construction, a high voltage—up to 25 kV—is applied to the electrodes. When the oxide reaches the gap with high voltage applied, the oxygen is converted to ozone. The produced ozone leaves the generator through the outlet port.

The first gap the oxide gas reaches may be a corona chamber or it may be a flow chamber as explained above leading the gas to the other gap where ozone is produces. When the generator only comprises one HVE and one dielectric the first gap may be a corona chamber or a flow chamber. However, the gas will always enter the generator in the middle of one of the gaps and will always leave the generator from the middle of the other gap. Due to the communication holes placed in the isolator a fluidly connection between the gaps is always present.

The dielectric is positioned between one LVE and one HVE, and the gaps are always positioned on each side of the isolator and delimited at one site by a LVE either directly when no dielectric is present or indirectly when the dielectric is present.

It is important that the dielectric is supported in its full extension by the LVE directly or indirectly. When indirectly supported an electrically conductive material can be placed between the two components. Due to the support of the fragile ceramic plate, it will not crack and the generator is suitable for use under high pressure loads. The LVE is a ground electrode.

When the generator comprises two HVE and two dielectric both gaps are corona chambers generating ozone.

The abbreviation "LVE" is in the whole document used for low voltage electrode and the abbreviation "HVE" is used for high voltage electrode.

According to one embodiment, the HVE(s) comprise(s) a circumferential edge delimiting the extension of the HVE(s), and that the dielectric(s) comprise(s) a circumferential edge delimiting the extension of dielectric (s) and the circumferential delimiting edge of the dielectric(s) in the whole periphery extends all over the delimiting edge of the HVE.

This ensures that no short-circuit/spark discharge can occur between the LVE and the HVE as the dielectric is protecting the LVE.

According to one embodiment, the circumferential delimiting edge of the dielectric throughout the periphery extends all over and beyond the delimiting edge of the HVE said part located beyond the delimiting edge of the HVE is covered by the isolator.

The isolator is pressing against the part located beyond the delimiting edge of the HVE whereby a seal of the gap takes place said O-ring supports sealing effect.

According to one embodiment the isolator has a radial extension equivalent to the radial extension of the first and the second LVE, and the isolator is located between the first and the second LVE, said isolator in the entire periphery of its two surfaces facing towards the first and the second LVE respectively is in contact with each LVE.

According to one embodiment, the communication holes comprise several parallel channels located in the isolator substantially symmetrical around a center of the ozone generator, and each channel fluid-connects one gap with the other gap.

The channels are running straight from the periphery of one gap to the periphery of the other gap. The channels are parallel to one another.

According to one embodiment, the dielectric(s) is/are a continuous unbroken plate(s)

By continuous unbroken is to understand that the plate does not comprise any through going holes or other mechanical weakening of the plate and includes unbroken continuous surfaces.

According to one embodiment, the outlet gas port is located in the isolator.

According to one embodiment, the inlet gas port is located in the first or the second LVE or is located in the isolator.

The inlet gas port is preferably located in the isolator.

According to one embodiment, one of the gaps is placed in a region between the first surface of one of the LVE and the isolator and the other gap is delimited by the first surface of one of the dielectrics and the first surface of one of the HVE.

One of the gaps (first gap) is always delimited by a dielectric and a HVE and off course placed in a region between a LVE supporting the dielectric and the isolator supporting the HVE. The other gap is always placed in a region between a LVE and the isolator, and is either delimited by these when only one HVE is present and placed in relation to the first gap, or it is delimited by a further HVE and a further dielectric.

According to one embodiment, ring formed seals such as O-rings are placed between the surfaces of the isolator turning towards the LVE and the respective first surfaces of the LVE, said seals are placed in the periphery.

According to one embodiment, at least one of the gaps is/are adapted to maintain a high AC voltage between one HVE and one LVE, and that a high voltage is applied to the at least one HVE by an electrical connection—such as a wire—to a connector part of said HVE.

According to one embodiment, the generator comprises one HVE, one dielectric and one corona-chamber.

According to one embodiment, the generator comprises two HVEs, a first HVE and a second HVE and two dielectrics, a first dielectric and a second dielectric, said first dielectric has a surface supported directly or indirectly in its full extension by the first LVE and the first gap being a corona-chamber is placed between the surface of the first dielectric turning towards the first HVE and the first surface of the first HVE, and the second dielectric has a surface supported directly or indirectly in its full extension by the first LVE surface of the second LVE and the second gap also being a corona-chamber is placed between the surface of the second dielectric turning towards the second HVE and the first HVE surface of the second HVE.

According to one embodiment, the width of the gaps measured between the limiting surfaces is throughout its extent uniform and around 50-1500 μm.

The invention also concerns a method as cited in the introduction, the gas is flowing from the center to the periphery of said gap where the gas is flowing through communications holes in the isolator making fluidly communication between the first and the second gap, whereby the gas is flowing into the other gap, said gas is flowing from the periphery of the other gap into center of said gap, said center of the gap being in fluid communication with the outlet port and the gas is leaving the other gap through said outlet port said leaving gas being ozone gas.

The communication holes comprise channels located in the isolator.

According to one embodiment the gas is running over the surface of the at least one dielectric said surface in question facing the gap, said dielectric(s) comprising a continuous unbroken plate.

According to one embodiment, the second gap is placed in a region between the second LVE and the isolator.

According to one embodiment, the LVEs are ground electrodes and are made in pure aluminum and that the HVE(s) also is/are made in pure aluminum.

According to one embodiment, that the gas led into the generator comprise pure oxygen or air or a combination thereof.

According to one embodiment, the dielectric is a coating coated on at least one of the first LVE surfaces of the LVEs.

Figure 1A:
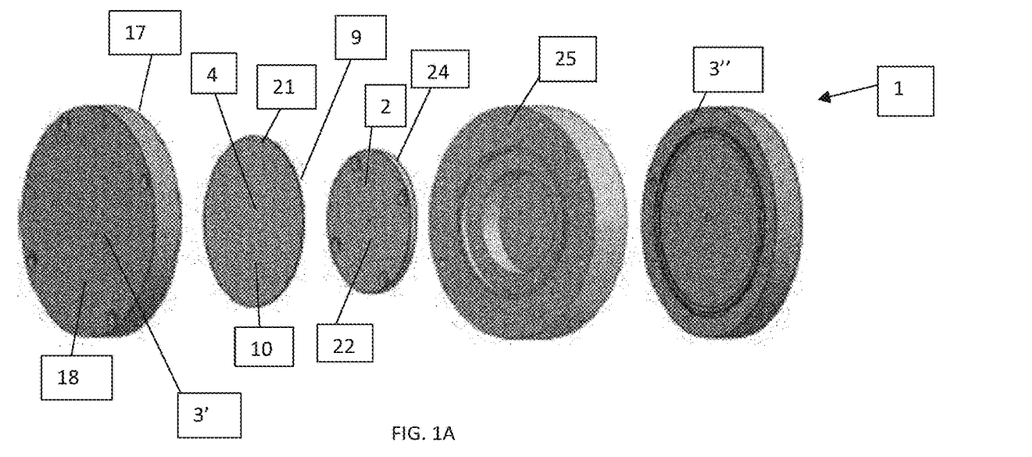
FIG. 1A is an exploded view of the components for a first embodiment of an ozone generator according to the invention comprising one HVE.

The invention will be explained with reference to FIG. 1A-C. FIG. 1A shows an explode view of an ozone generator 1 according to the invention comprising an isolator 25 made in a non-conductive material such as thermoplastic materials. A suitable material is polytetrafluoroethylene (PTFE) also called Teflon. At one side of this a low voltage electrode is placed—a second low voltage electrode (LVE) 3"—and attached to the isolator 25 in the periphery for instance with screws. The low voltage electrode 3" is advantageously made in pure aluminum and is flat plate shaped. At the other side of the isolator 25, a high voltage electrode (HVE) 2 is attached. This may also me fastened to the isolator 25 by screws. The surface of the HVE 2 turning away from the isolator 25—the first HVE surface 22 of the HVE—is facing first surface 9 of a dielectric 4, which in this case is a flat circular plate with a thickness in the interval of 500-700μ. It is made in a material such a ceramic ($Al_2O_3$), Teflon, glass or another non-conductive material.

As can be seen the components of the generator 1 is circular shaped but could be made in any shape such as square or rectangular etc. The HVE 2 is bounded by a peripheral edge 24 and the dielectric 4 is bounded by a peripheral edge 21. The edge 21 of the dielectric 21 protrudes the edge 24 of the HVE throughout the HVE when the device is assembled. When the components are circular shaped the diameter of the dielectric 4 is larger than the diameter of the HVE 2. The surface of the dielectric 4 turning away from the HVE 2—the second surface 10—is facing and directly or indirectly in its full extension resting against a surface of a first LVE surface 17 of a first LVE 3'.

Figure 1B:
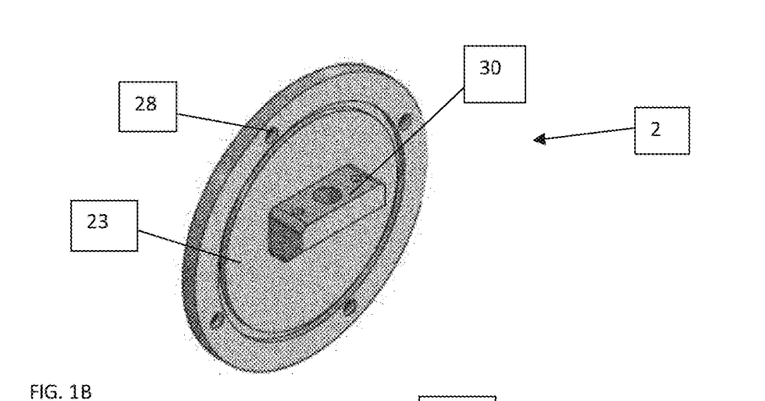
FIG. 1B is a perspective view of the HVE shown in FIG. 1A.

FIG. 1B shows a perspective view of the HVE 2 shown in FIG. 1A. The surface of HVE 2 facing away from the dielectric 4—the HVE second surface 23 of the HVE 2—is constructed with a connector part 30. It connects a wire/a duct with the interior of the generator 1 with the external—through an inlet port—allowing gas to flow through the generator 1. Further, it is also the place for electrical wires to connect to the HVE 2 in order to provide the high voltage for producing ozone.

The HVE 2 is equipped with through holes 28 placed in the periphery in order to fasten the HVE 2 to the isolator 25 with for instance screws. This construction of the HVE 2 is used for embodiment one and two.

Figure 1C:
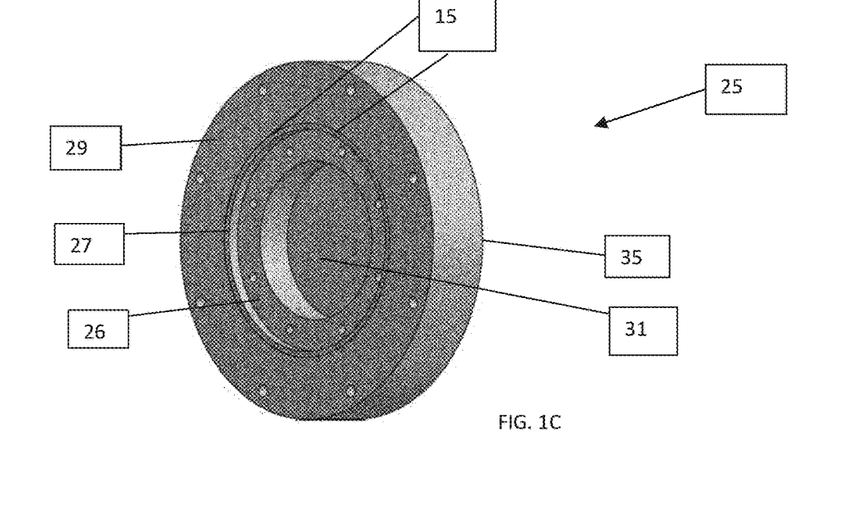
FIG. 1C is a perspective view of the isolator shown in FIG. 1A.

FIG. 1C shows a perspective view of the isolator 25 shown in FIG. 1A. It is a circular formed unit comprising a circular recess 31 placed in the center of the first surface 29 of the isolator 25 and making room for the connector part 30 when the generator 1 is assembled. The recess 31 is encircled in the periphery by a first circumferential shelf 26. The HVE 2 is resting against the shelf 26 attached to it preferably with screws. Above the first circumferential shelf 26, a second circumferential shelf 27 is placed. This is a narrow shelf and when the LVE and the dielectric is placed above the shelf 27, it will constitute a part of a gap, which will be explained below. In the narrow second shelf 27 through going communication holes 15 are placed. They are connecting the gap mentioned above with a gap placed at the opposite side of the isolator 25. The gap at the opposite side of the isolator 25 is delimited at one said by the second surface 35 of the isolator the surface being substantially even and flat. This construction of the isolator 25 is used for the first embodiment. The second embodiment of the ozone generator 1 according to the invention comprises an opposite surface constructed as the first surface 29 of the first embodiment comprising the recesses. The isolator 25 in the second embodiment is actually made by two isolators 25 as known from the first embodiment but where the second surfaces of the two isolators 25 constructed for the first embodiment are connected to each other by being molded or glued. Thereby an isolator 25 suitable for the second embodiment is constructed. The dielectric and the HVE used for the first embodiment are also used for the second embodiment without significant adjustments.

Figure 2A:
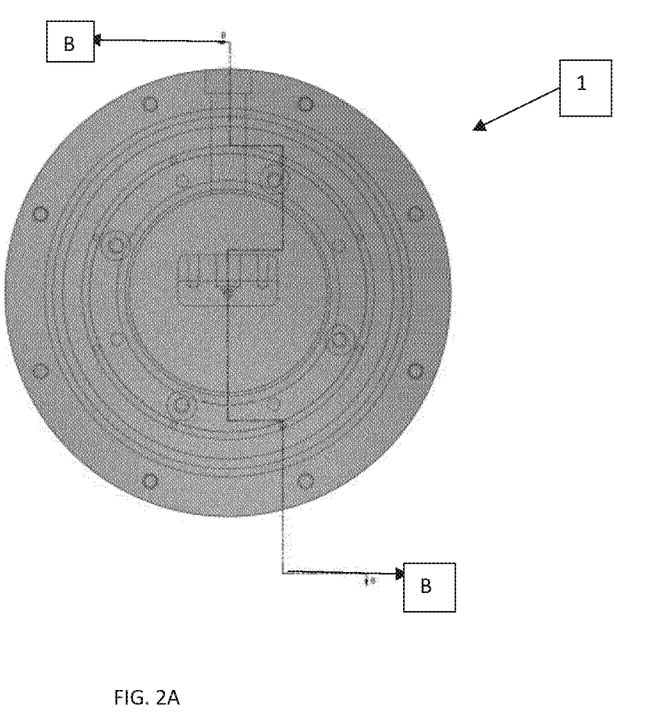
FIG. 2A is an x-ray view of a generator according to the invention and seen from the top of the generator.
Figure 2B:
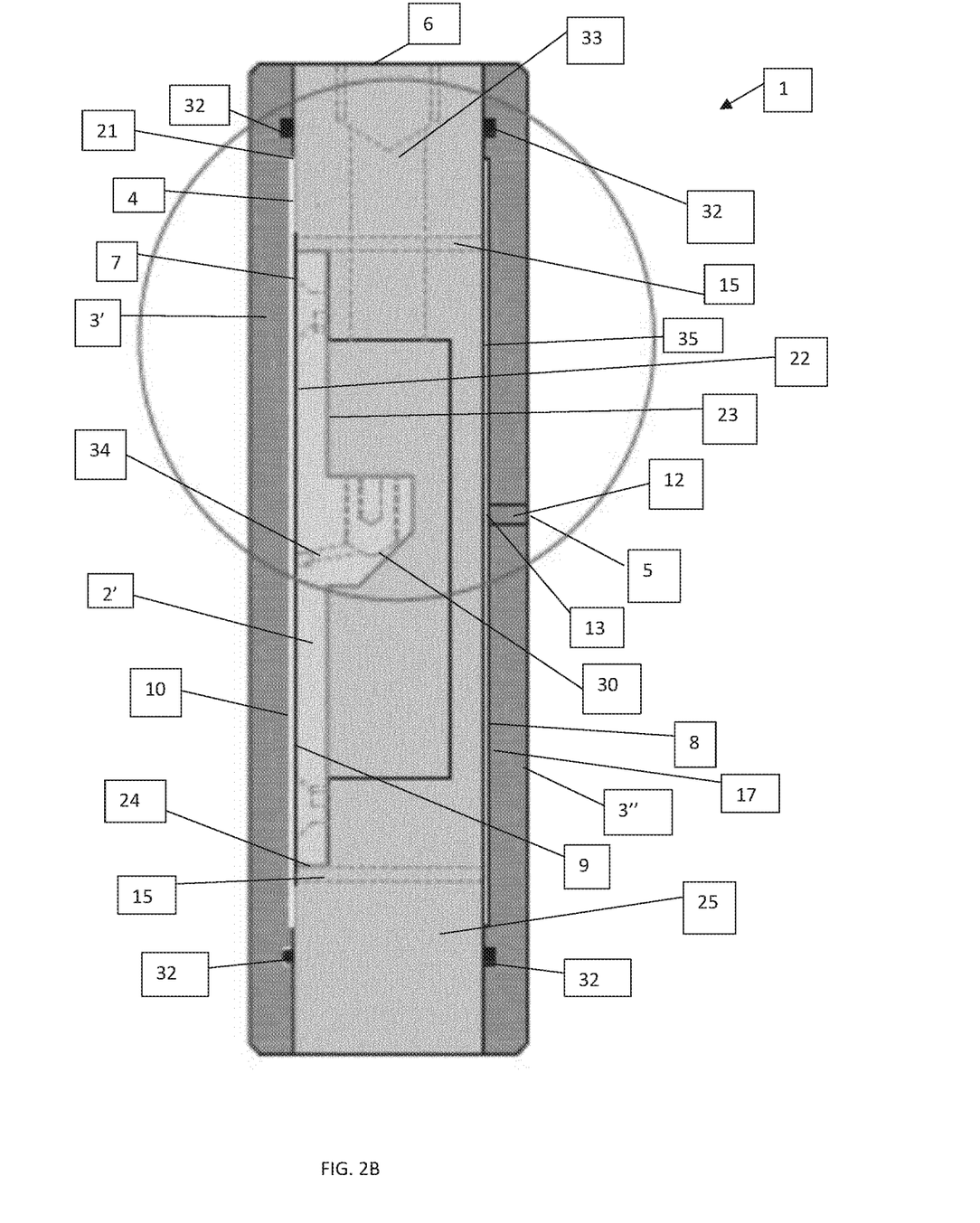
FIG. 2B is a sectional view of the generator shown in FIG. 2A along the line B-B.
Figure 2C:
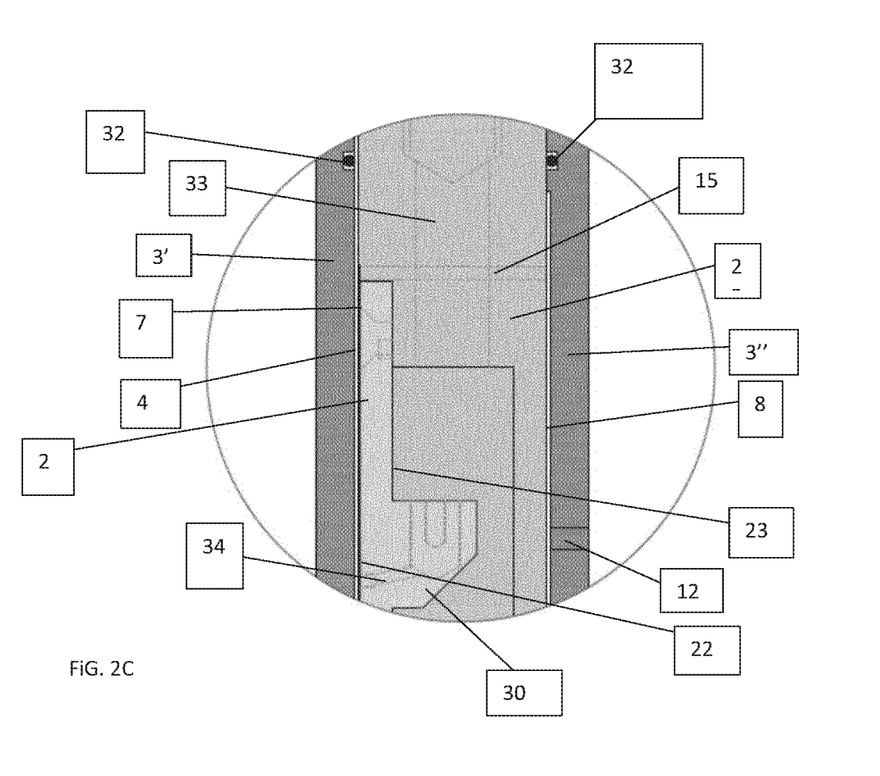
FIG. 2C is an enlarged section of FIG. 2B.
Figure 2D:
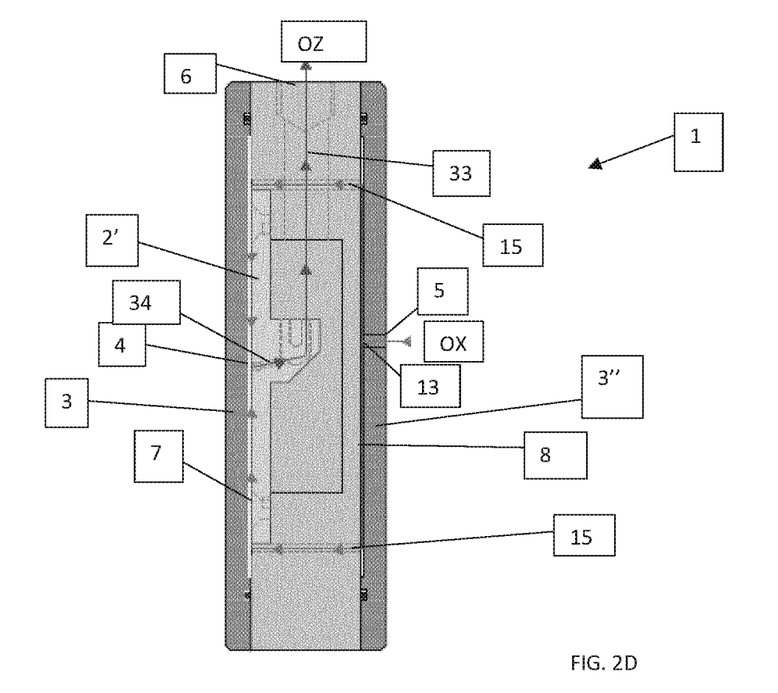
FIG. 2D is showing the flow of a gas through a generator according to the first embodiment.

A first embodiment according to the invention is disclosed in FIG. 2A which is an x-ray view of a generator 1 shown from the top of a generator 1 while FIG. 2B is a sectional view of the generator shown in FIG. 2A along the line B-B. A circle is indicating an enlarged section shown in 2C. Further, FIG. 2D is showing how gas is running through the generator leading oxygen rich gas OX into the generator, and ozone OZ generated in the generator leaving it through the outlet port.

The generator 1 comprises two LVE 3—a first LVE 3' and a second LVE 3"—placed on either side of the other components of the generator 1. An inlet port 5 is placed in the center of the second LVE 3" leading into an inlet duct 12. It ends in a gap—the second gap 8—delimited at one side of the inner surface 17 of the second LVE 3" and on the other side by a flat and even surface—a second surface 35—of the isolator 25. O-rings 32 are placed in the periphery seeing to that the gap 8 is a closed chamber. Oxide rich gas is led into the second gap 8 in a center portion 13 of the gap 8 and moves to the periphery of the gap 8 and escapes through communication holes 15 placed with openings in the periphery of the gap 8. The through going holes 15 are placed in the isolator 25 and connects the second gap 8 with a first gap 7 placed at the opposite side of the isolator 25 as explained above. They are channels located in the isolator 25. The HVE 2 is placed at the same side of the isolator 25 as the first gap 7 as explained above. The first HVE surface 22 of the HVE 2 turning towards the first gap 7 is even, flat, and delimits the first gap 7 at one side.

The first gap 7 is at the other side delimited by the first surface 9 of dielectric 4, which is a thin ceramic plate. O-rings 32 are placed in the periphery seeing to that the gap 7 is a closed chamber.

One side of the ceramic plate 4—the second surface 10—is supported by the first LVE 3' (ground electrode) in its full extension. The support may be a directly support the two surfaces touching each other, or it may be indirectly by having for instance a thin conductive material incorporated between them. The gas is now flowing from the periphery of the first gap 7 to the center of the first gap 7 where it escapes though a connection duct 34 connecting the first gap 7 with the outlet port 6 through a duct 33 in the isolator 25 and the connection part 30.

The corona chamber—that is where ozone is produced—is the first gap 7 where the oxygen rich gas is converted to ozone in the know way. The dielectric 4 is covering an area that exceeds the area of the HVE 2 whereby an electrical short circuit is avoided. The HVE 2 comprises a circumferential edge 24 delimiting the extension of the HVE 2. A circumferential edge 21 delimiting the extension of dielectric extends all over the delimiting edge 24 of the HVE 2.

The electricity is led to the connector part 30 of the HVE 2 placed on the second HVE surface 23 through an opening in the isolator 25 that also comprise the outlet duct 33. A high AC voltage between the HVE 2 and the first LVE 3' is established.

The communication holes 15 are placed with the same distance to the center of the generator 1 and with the same distance between them.

Figure 2E:
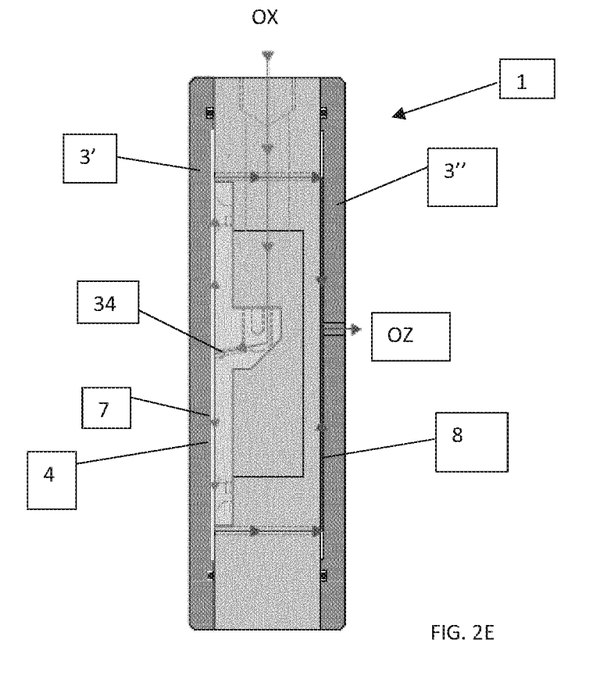
FIG. 2E is showing a second way of letting the gas flow through a generator according to the first embodiment and where the gas has been reversed compared with what is shown in FIG. 2D.

However, the same generator can be used for producing gas where the flow has been reversed. This is shown in FIG. 2E. In this case the same generator as shown in FIG. 2B is used but where the outlet duct 33 is used for leading oxygen rich gas into the generator (is equivalent to the inlet duct 12). The reference signs/terms may so to speak be a little misleading but is kept in order to underline that the construction in principle is the same as the one used for the gas flow shown in FIG. 2D. The gas is led into the middle of the generator 1 and through the connector part 30 flowing through the connection duct 34 towards the center portion 13 of the first gap 7. From here, it is flowing to the periphery of the gap 7. During the flow, the oxygen gas is transformed to ozone due to the high voltage applied to the HVE. The gas leaves the gap 7 through the communication holes 15 and passes into the second gap 8. Here it flows towards the middle of the gap 7 and leaves the generator through what is denoted the inlet port in FIG. 2B but here is an outlet port. The flow inside the generator may be regulated as a function of the diameter of the outlet port placed in the LVE.

Figure 3A:
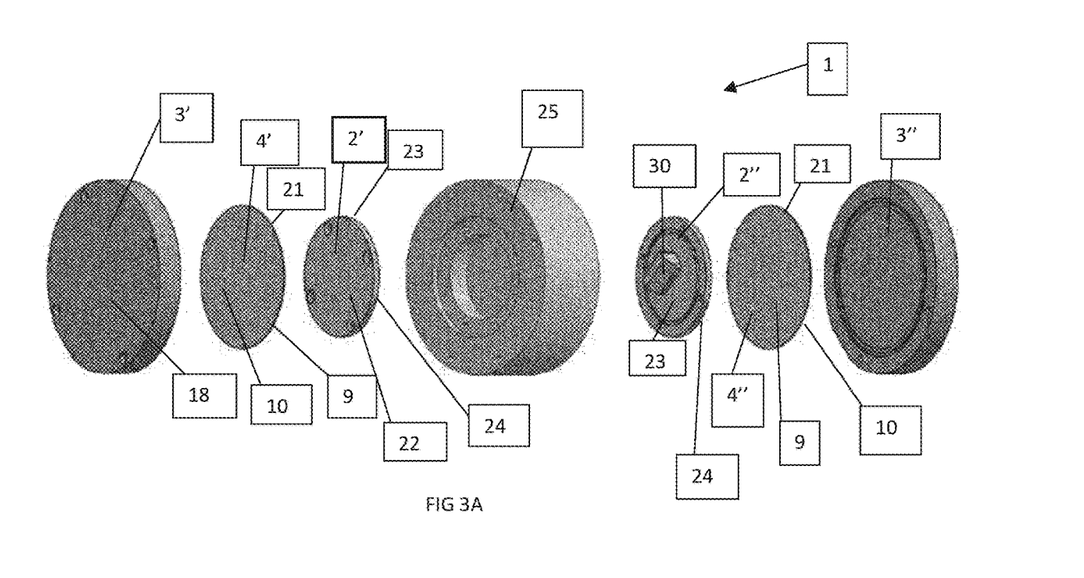
FIG. 3A is an exploded view of the components for a second embodiment of an ozone generator according to the invention comprising two HVE.
Figure 3B:
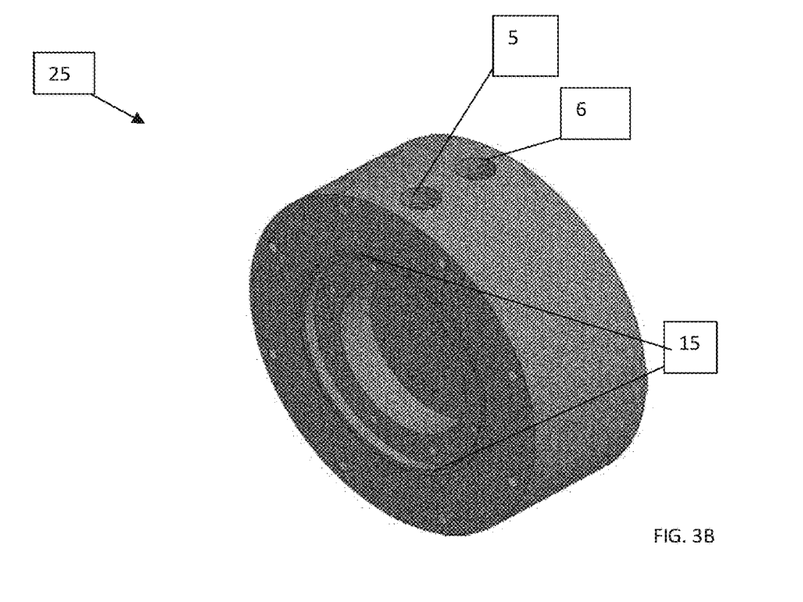
FIG. 3B is a perspective view of the isolator shown in FIG. 3A.

FIG. 3A is an explode view of the components for a second embodiment of a generator according to the invention comprising two HVE: a first HVE 2' and a second HVE 2". The reference sign used for this embodiment is the same as for the first embodiment representing same technical features. A further difference between the two embodiments is that the device shown in FIG. 3 comprises two dielectrics: a first dielectric 4' and a second dielectric 4". The isolator 25 is as explained above constructed different compared The communication holes 15 are placed in a recess as explained with reference to the first embodiment.

On the side of the isolator 25 two ports 5, 6 are placed each having access to the connector part 30 of each HVE 2. Through one of the ports—the inlet port 5—the oxygen rich gas is led and ozone gas is leaving the generator through the outlet port 6. Two electric wires for generating the high voltage currency is also placed in the ports 5, 6 and each engaging the connector part 30 of a HVE 2.

Figure 4A:
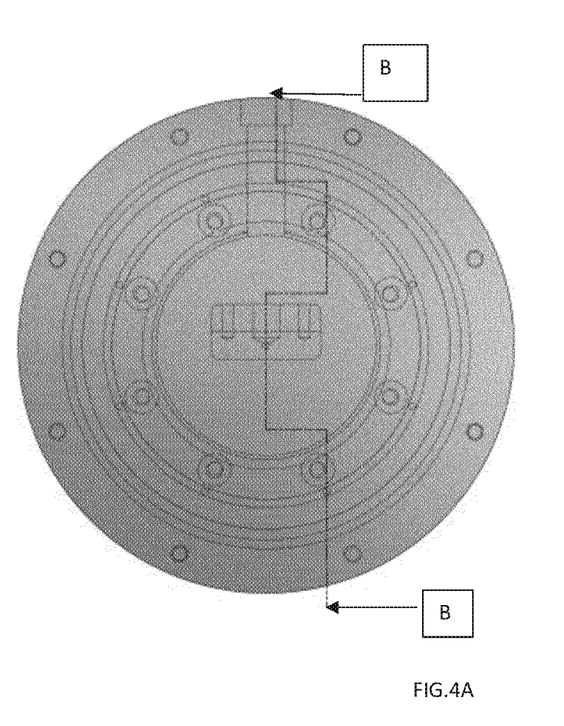
FIG. 4A is an x-ray view of a generator according to the invention and seen from the top of the generator.
Figure 4B:
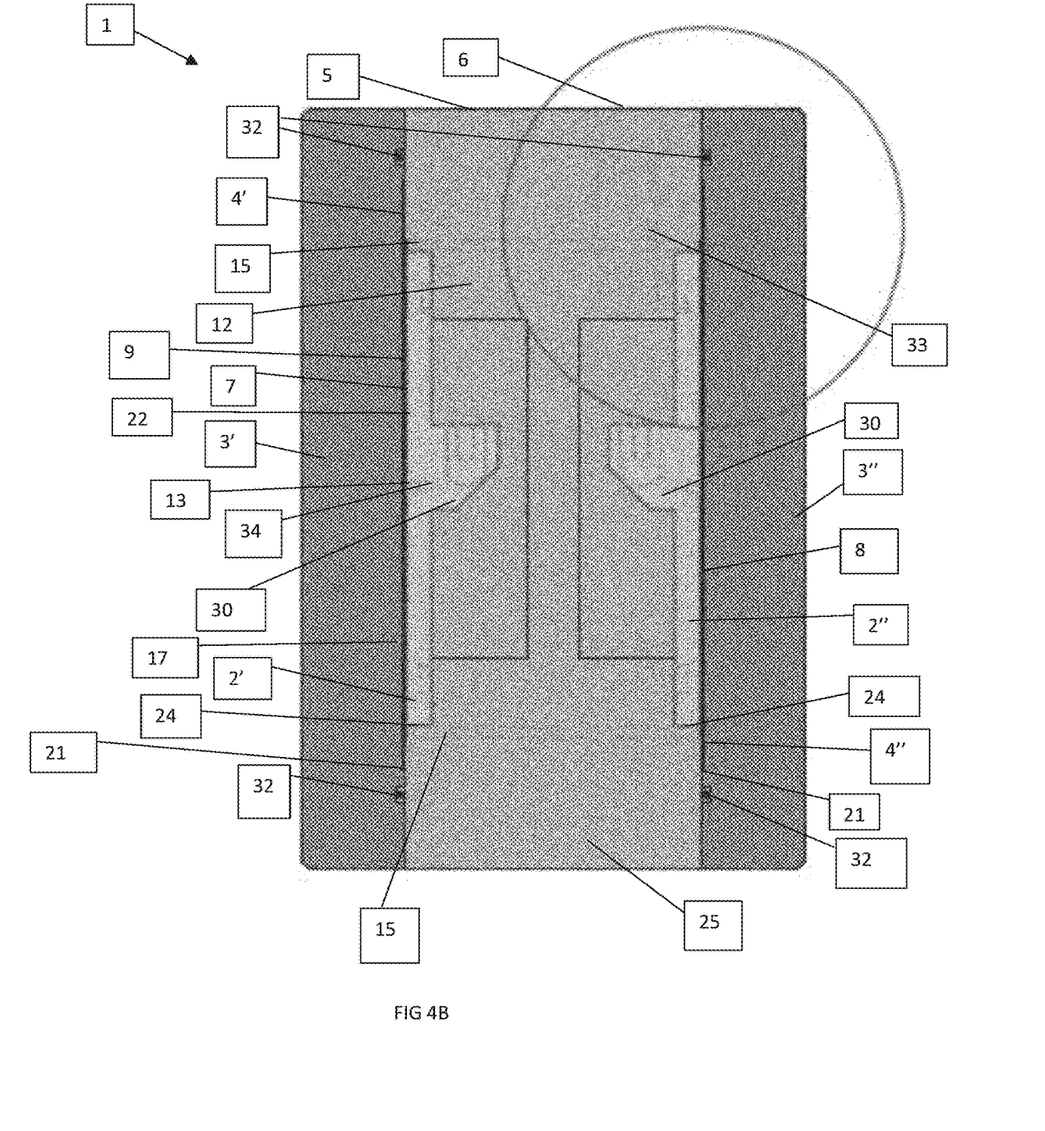
FIG. 4B is a sectional view of the generator shown in FIG. 4A along the line B-B.
Figure 4C:
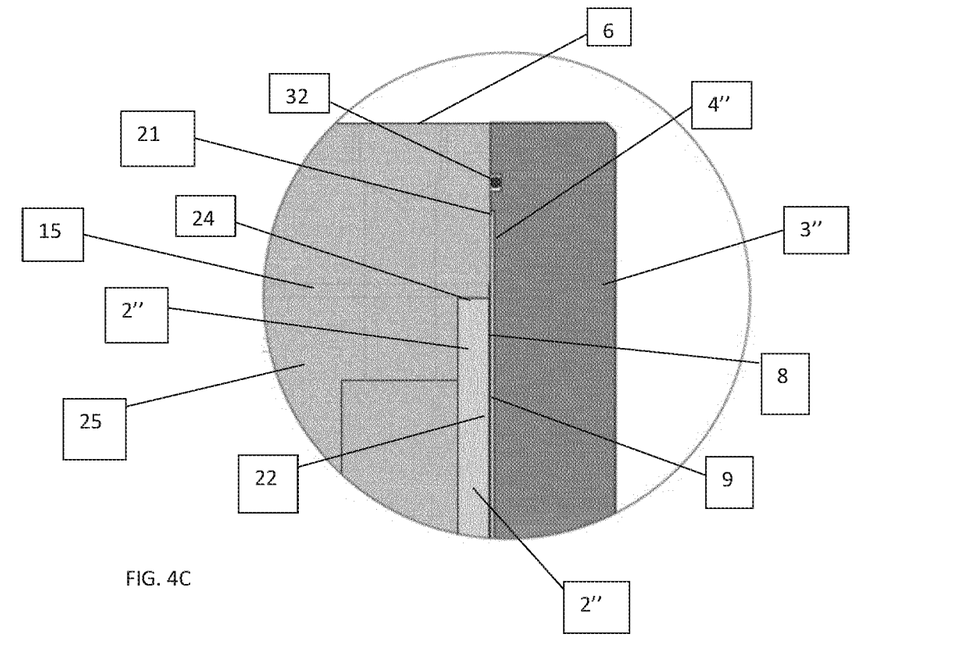
FIG. 4C is an enlarged section of FIG. 4B.
Figure 4D:
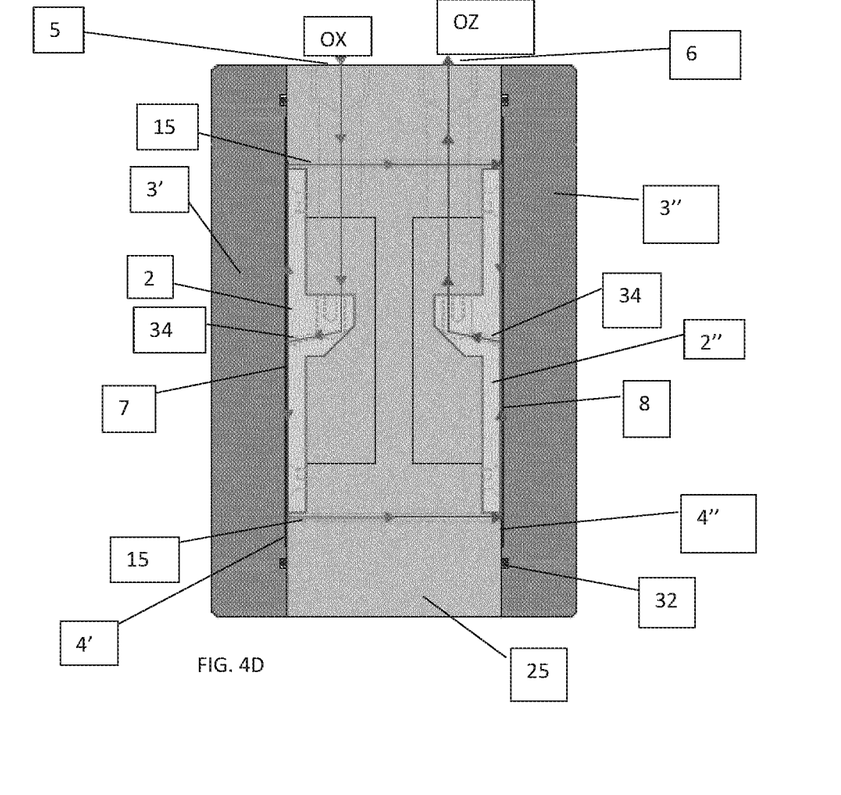
FIG. 4D is showing the flow of a gas through a generator according to the second embodiment.

The construction of the second embodiment will be explained with reference to FIG. 4B being a sectional view of the generator shown in FIG. 4A and FIG. 4C being an enlarged section of FIG. 4B. The flow of the gas is shown in FIG. 4D.

The generator 1 comprises two LVE 3—a first LVE 3' and a second LVE 3"—placed on either side of the inner components of the generator 1. An inlet port 5 is placed in the isolator as explained above leading into an inlet duct 12 which ends in the connector part 30 of the first HVE 2'. From here, a connection duct 34 is provided through the first HVE 2' leading the gas up to a center portion 13 of a first gap 7. This is at one side delimited of the facing surface (flat and even)—the first HVE surface 22—of the first HVE 2' and on the other side by a flat and even surface—the first surface 9—of the first dielectric 4' placed on and supported by the first LVE surface 17 of the first LVE 3'. The dielectric 4' is supported in its full extension by the first LVE surface 17 of the first LVE 3'. The dielectric 4' has an extension so a delimiting edge 21 of the first dielectric 4' in the whole periphery extends all over a circumference of the first HVE 2'.

O-rings 32 are placed in the periphery seeing to that the first gap/chamber 7 is a closed chamber. Oxide rich gas is led into the first gap 7 and through the inlet port 5, the inlet duct 12 and through the connection duct 34 and moves to the periphery of the gap 7 escaping through the communication holes 15 placed with openings in the periphery of the gap 7. The holes 15 are placed in the isolator 25 and connect the first gap 7 with a second gap 8 placed at the opposite side of the isolator 25. They are formed as channels located in the isolator 25.

The second gap 8 is delimited by a second dielectric 4" and the second HVE 2" and the construction of it is as explained above for the first gap 7. The gas is running into the middle of the second gap 8 from both periphery sides of the gap 8. In the middle a connection duct 34 is provided letting the gas escape form the second gap 8 to the connector part 30 of the second HVE 2" and from here the gas is leaving the generator 1 through the outlet duct 33 and out through the outlet gas port 6.

The surfaces of both the HVEs 2', 2" turning towards the gaps are even and flat and delimits the gaps in question at one side. At the other side the dielectrics 4', 4" are delimiting their respective gaps 7, 8. O-rings are placed in the periphery as explained above.

One side of the ceramic plates 4', 4" the second surface 10—is supported by the LVE 3', 3" (ground electrode) in the full extension. The support may be a directly support the two surfaces touching each other or it may be indirectly by having for instance a thin metal net/plate incorporated between them.

The gas flows from the middle to the periphery of the first gap 7 to the periphery and enters the second gap 8 through the communication holes 15, flows to the middle of the second gap 8 where it escapes though the connection duct 34 connecting the outlet duct 33 and out through the outlet port 6.

The corona chambers—that is where ozone is produced—is in this second embodiment the first gap 7 and the second gap 8 where the oxygen rich gas is converted to ozone in the know way. The communication holes 15 are placed with the same distance to the center of the generator 1 and with the same distance between them.

The LVE are made in pure aluminum and the dielectric are preferably made in a ceramic material $Al_2O_3$ or another non-conductive material. The isolator is made in an isolating material such as Teflon while the HVEs preferably are made in pure aluminum.

Due to the gas in the second embodiment is running over two HVE and thereby providing two corona chambers separated from each other and producing ozone at different time the utilization factor is very high. A lot of ozone is produced compared with the known devices using the same amount of oxide.

The dielectric is in the examples shown as ceramic plates. However, they could also be coatings applied on the surface of the LVE and with an extension as explained for the plate-formed dielectric having a circumferential edge exceeding the circumferential edge of the HVE.

The invention claimed is:

1. An ozone generator for generating ozone comprising at least one high voltage electrode (HVE), a first electrode, having a first HVE surface, an opposite second HVE surface;
    two low voltage electrodes (LVE), a first LVE and a second LVE each comprising a first LVE surface and an opposite second LVE surface, said HVE(s) is/are placed in a region between the LVE;
    at least one dielectric and an electric isolator placed in an area between the two LVE;
    an inlet gas port for leading oxygen rich gas into the generator and an outlet gas port for leading generated ozone gas out of the generator;
    a first gap and a second gap and at least one of the gaps being a corona chamber that at least one dielectric comprising a first surface is turning towards the first HVE-surface and an opposite second surface is turning towards the first LVE surface of one of the LVE, at least one of the gaps is placed between the first surface of said dielectric and the first HVE-surface, the at least of the gaps being a corona-chamber adapted to develop ozone and that the oxygen is led through the inlet gas port to a duct ending in a center portion of one of the gaps;
    the second surface of the dielectric is directly or indirectly supported in its full extension by the first LVE-surface, and the isolator has a plurality of communication holes placed in a distance from a center of the isolator and the communication holes being in fluid communication with the duct; and
    said communication holes are fluidly connecting the two gaps, whereby gas is allowed to flow from the gap being in fluid communication with the inlet gas port to the opposite placed gap being in fluid communication with the outlet gas port.

2. The ozone generator according to claim 1, wherein the HVE(s) comprise(s) a circumferential edge delimiting the extension of the HVE(s), and that the dielectric(s) comprise(s) a circumferential edge delimiting the extension of dielectric(s) and the circumferential delimiting edge of the dielectric in the whole periphery extends all over the delimiting edge of the HVE.

3. The ozone generator according to claim 2, wherein the circumferential delimiting edge of the dielectric throughout the periphery extends all over and beyond the delimiting edge of the HVE said part located beyond the delimiting edge of the HVE is covered by the isolator.

4. The ozone generator according to claim 1, wherein the isolator has a radial extension equivalent to the radial extension of the first and the second LVE and the isolator is located between the first and the second LVE, said isolator in the entire periphery of its two surfaces facing towards the first and the second LVE respectively is in contact with each LVE.

5. The ozone generator according to claim 1, wherein the communication holes comprise several parallel channels located in the isolator substantially symmetrical around a center of the ozone generator, and each channel fluid-connects one gap with the other gap.

6. The ozone generator according to claim 1, wherein the dielectric(s) is/are a continuous unbroken plate(s).

7. The ozone generator according to claim 1, wherein the outlet gas port is located in the isolator.

8. The ozone generator according to claim 1, wherein the inlet gas port is located in the first or the second LVE or is located in the isolator.

9. The ozone generator according to claim 1, wherein one of the gaps is placed in a region between the first surface of one of the LVE and the isolator and the other gap is delimited by the first surface of one of the dielectric and the first surface of one of the HVE.

10. The ozone generator according to claim 1, wherein as O-rings are placed between the surfaces of the isolator turning towards the LVE and the respective first surfaces of the LVE, said O-rings are placed in the periphery.

11. The ozone generator according to claim 1, wherein at least one of the gaps is/are adapted to maintain a high AC voltage between one HVE and one LVE, and that a high voltage is applied to the at least one HVE by an electrical connection to a connector part of said HVE.

12. The ozone generator according to claim 1, wherein the generator comprises one HVE, one dielectric and one corona-chamber.

13. The ozone generator according to claim 1, wherein the generator comprises two HVE a first HVE and a second HVE, and two dielectric a first dielectric and a second dielectric, said first dielectric has a surface supported directly or indirectly in its full extension by the first LVE and the first gap being a corona-chamber is placed between the surface of the first dielectric turning towards the first HVE and the surface of the first HVE, and the second dielectric has a surface supported directly or indirectly in its full extension by the first LVE surface of the second LVE, and the second gap also being a corona-chamber is placed between the surface of the second dielectric turning towards the second HVE and the first HVE surface of the second HVE.

14. The ozone generator according to claim 1, wherein the width of the gaps measured between the limiting surfaces is throughout its extent uniform and and between 50-1500 µm.

15. A method for generating ozone from an oxygen rich gas comprising:
 leading the oxygen rich gas into an ozone generator comprising at least one high voltage electrode (HVE)—a first electrode—having a first HVE surface, an opposite second HVE surface and two low voltage electrodes (LVE), a first LVE and a second LVE each comprising a first LVE surface and an opposite second LVE surface, wherein said HVE(s) is/are placed in a region between the two LVE, and wherein the generator further comprises at least one dielectric and an electric isolator placed in an area between the two LVE, an inlet gas port for leading oxygen reach gas into the generator and an outlet gas port for leading generated ozone gas out of the generator, and wherein the generator further comprises a first gap and a second gap and at least one of the gaps being a corona chamber;
applying a voltage to the at least one HVE electrodes;
leading the oxygen rich gas into a center of a selected gap from the first gap or the second gap wherein the gas is flowing from the center to the periphery of said selected gap from the first gap or the second gap where the gas is flowing through communications holes in the electric isolator making fluid communication between the first and the second gap;
flowing the gas into a unselected gap from the first gap or the second gap;
flowing said gas from the periphery of the unselected gap from the first gap or the second gap into center of said selected gap from the first gap or the second gap, said center of said selected gap from the first gap or the second gap being in fluid communication with the outlet port; and
wherein the gas is leaving the unselected gap from the first gap or the second gap through said outlet port said leaving gas being ozone gas.

16. The method according to claim 15, wherein the gas is running over the surface of the at least one dielectric, wherein said surface faces the at least one of the first or second gap, and wherein said dielectric(s) comprise a continuous unbroken plate.

* * * * *